United States Patent [19]
van der Meer et al.

[11] Patent Number: 5,538,060
[45] Date of Patent: Jul. 23, 1996

[54] PNEUMATIC TIRE HAVING TREAD PORTION INCLUDING BLOCKS

[75] Inventors: Alex van der Meer, Schieren, Luxembourg; Claude Lardo, Walzing, Belgium

[73] Assignee: The Goodyear Tire & Rubber Company, Akron, Ohio

[21] Appl. No.: 364,364

[22] Filed: Dec. 27, 1994

[51] Int. Cl.$^6$ .................................................. B60C 11/11
[52] U.S. Cl. ................................. 152/209 R; 152/DIG. 3
[58] Field of Search .......................... 152/209 R, 209 D, 152/DIG. 3; D12/138, 140, 146, 147, 148

[56] References Cited

U.S. PATENT DOCUMENTS

| | | | |
|---|---|---|---|
| D. 324,665 | 3/1992 | Davis et al. ........................ | D12/146 |
| 4,437,503 | 3/1984 | Seitz et al. ......................... | D12/140 |
| 4,481,991 | 11/1984 | Pieper ................................ | 152/209 R |
| 4,649,975 | 3/1987 | Kogure et al. .................... | 152/209 R |
| 4,690,189 | 9/1987 | Bradisse et al. ................... | 152/209 R |
| 5,178,699 | 1/1993 | Kakumu et al. ................... | 152/209 R |
| 5,256,221 | 10/1993 | Trabandt ............................ | 152/209 R |
| 5,361,816 | 11/1994 | Hitzky .................................. | 152/209 |
| 5,385,189 | 1/1995 | Aoki et al. .......................... | 152/209 R |

*Primary Examiner*—Steven D. Maki
*Attorney, Agent, or Firm*—David E. Wheeler

[57] ABSTRACT

A pneumatic tire having a tread with a block design suited for off-road use. The tire has a ground contacting tread portion with circumferentially extending grooves and laterally extending grooves comprising at least a portion of an S-shape, defining circumferentially extending rows of blocks. The blocks comprise a first, second and third portion; the laterally outer, first and third portions, having a trapezoidal shape, are linked together by the second portion, having a height which is lower than the height of said first and third portions. In a preferred embodiment the tread has six rows of blocks spaced by five circumferentially extending straight grooves.

9 Claims, 3 Drawing Sheets

PNEUMATIC TIRE HAVING TREAD PORTION INCLUDING BLOCKS

BACKGROUND

The invention relates to pneumatic tire treads as well as to pneumatic radial tires comprising such a tread. Such tires are suited for use on passenger and light truck vehicles and more specifically for use on 4=4 light truck vehicles.

Light truck tires tend to have an aggressive, all block tread pattern, which provides good traction off the road. The use of blocks as elements in the tread tends to increase the noise level generated by such tires as compared to rib-type tires. Also such blocks have a tendency towards irregular wear due primarily to their lack of stiffness in the circumferential direction of the tread.

It is an object of this invention to provide a tire tread having an excellent block stiffness distribution leading to low noise emission. It is a further object of the invention to provide a tire having good handling properties and an improved rolling resistance, as compared to conventional tires. Other objects of the invention will be apparent from the following description and claims.

SUMMARY OF THE INVENTION

The tire of the invention comprises at least a pair of annular beads, at least one carcass ply wrapped around the beads, a ground contacting tread portion disposed over the carcass ply in a crown area of the tire and sidewalls disposed between the tread and the beads.

In one embodiment, the ground contacting portion of the tread includes circumferentially extending grooves and laterally extending grooves comprising at least a portion of an S-shape, defining circumferentially extending rows of blocks comprising two rows of shoulder blocks and at least a further row of blocks therebetween, wherein each block of said further row of blocks comprises, a first, second and third portion, the laterally outer, first and third portions having a trapezoidal shape with a short and a long base and two lateral sides, each lateral side being longer than either base, the longer base of the first portion being substantially in alignment with the shorter base of the third portion, and the bases delimiting part of a laterally extending groove, and wherein one of the lateral sides of each of the first and third trapezoidal portions delimits part of a circumferentially extending groove, and the other of the lateral sides of the first and third portions are adjacent and arranged substantially parallel to each other and delimit the second portion, which has a height which is lower than the height of the first and third portions. The second portion has a height comprised between 45% and 85% of the height of the first or third portion, a length comprised between 80% and 95% of the length of the adjacent lateral side of the first or third portion and a width comprised between 1% and 3% of the tread width. The first and third portions have a height equal to the tread depth.

The laterally extending grooves comprise two circumferentially shifted portions extending continuously from the equatorial plane to the tread edge.

In an illustrated embodiment, the pneumatic tire has five circumferentially extending straight grooves spacing the four rows of blocks, as described above, and two shoulder rows of blocks. The width of the grooves ranges between 0.3% and 1.8% for the two grooves closest to the shoulder, between 2.5% and 4.5% for the groove located on the equatorial plane and between 4.5% and 6.5% of the tread width for the two grooves located therebetween.

In a further embodiment the pneumatic tire has five circumferentially extending grooves having a width ranging between 3.5% and 6% for the two grooves closest to the shoulder, between 1% and 2.5% for the groove located on the equatorial plane and between 2% and 4.5% of the tread width for the two grooves located therebetween.

In the illustrated embodiments of the invention, sipes are located in all the blocks on the tire. Most of the sipes are oriented substantially parallel to the nearest laterally extending groove.

A tire tread, substantially as described with respect to the tire described above is also provided.

DETAILED DESCRIPTION OF THE INVENTION

For the purpose of this invention, a pneumatic radial tire is a tire wherein the cords of the carcass reinforcement which extend from bead to bead are substantially parallel to one another and are laid at a cord angle between 75° and 90° with respect to the equatorial plane (EP) of the tire. As used herein, "equatorial plane" refers to a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire. "Groove" means an elongated void area in a tread that may extend circumferentially or laterally in the tread in a straight, curved or zig-zag manner. It is understood that all groove widths are measured perpendicular to the centerline of the groove. A "sipe" is a groove having a width in the range from about 0.2% to 0.8% of the tread width. Sipes are typically formed by steel blades, having a width of 0.4 to 1.6 mm, inserted into a cast or machined mold. "Tread width" (T) is defined as the greatest axial distance across a tread, when measured (using a footprint of a tire,) laterally from shoulder to shoulder edge on the cavity shape, when mounted on the design rim and subjected to a specified load and when inflated to a specified inflation pressure for said load. The "tread arc width" (TAW) describes the total curved tread extension from shoulder edge to shoulder edge. Obviously, as the tire tread is curved, TAW is always a few percent larger than T because the shoulder (which is usually round, not sharp) is not fully in contact with the road. Axial widths and other widths of other tread features or components are measured under the same condition as the tread width. By "footprint" is meant the contact patch or area of contact of the tire tread with a flat surface under normal load, pressure and speed conditions.

Figure 2:
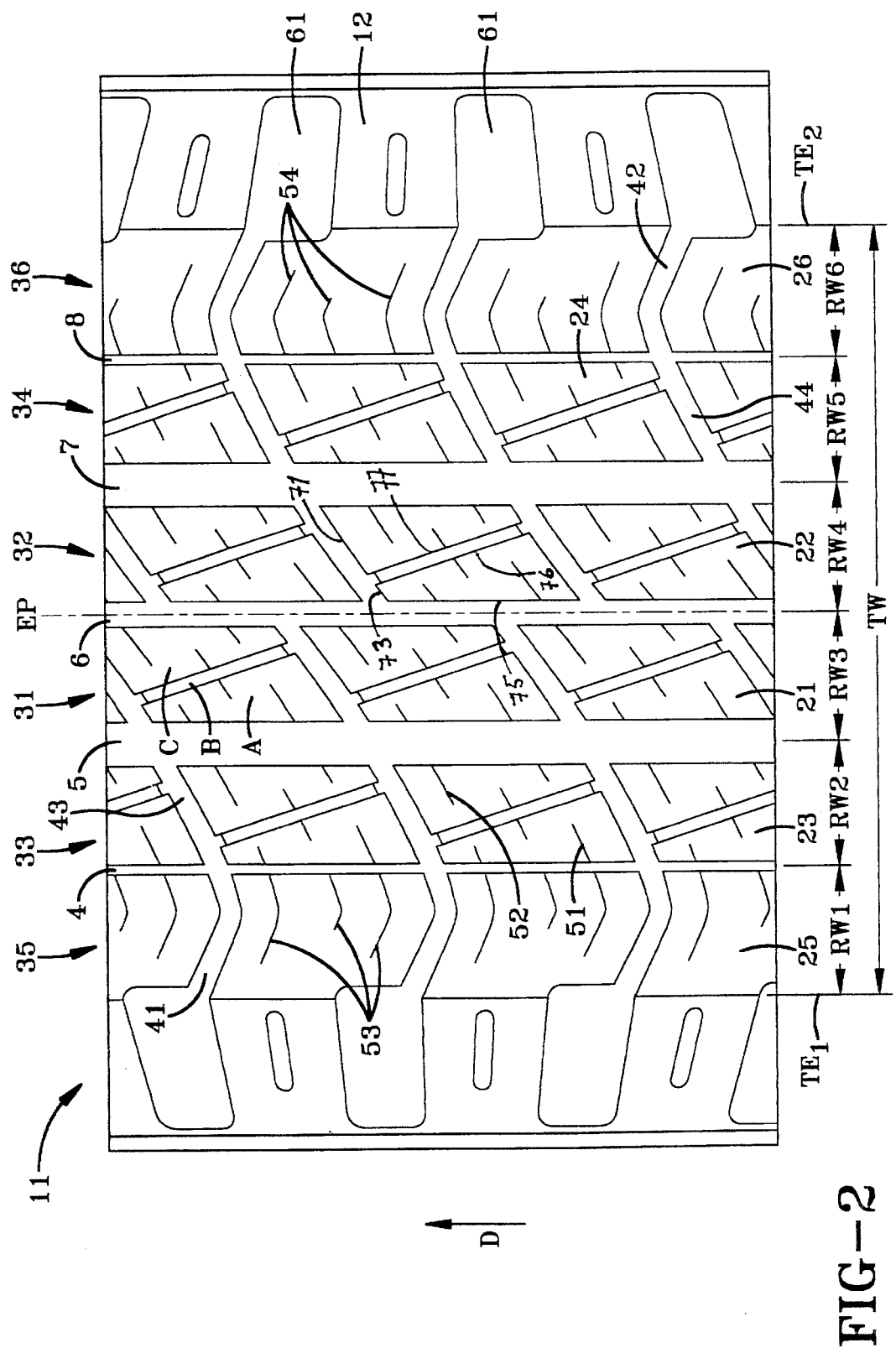
FIG. 2 is an enlarged fragmentary view of a portion of the tread of the tire of FIG. 1.

As used herein and looking in the direction of arrow D in FIG. 2, for example, lines that are in the second and third geometric quadrants, form with respect to the equatorial plane (EP) a positive angle and lines that are in the first and fourth quadrants form with respect to the equatorial plane a negative angle. As recognized by those skilled in the art, many tread designs have substantially the same performance as their mirror image, e.g. treads including "Z" shaped in place of "S" shaped laterally extending grooves. Consequently in interpreting the different embodiments and the claims, the positive angles or angle ranges indicated must be understood as encompassing also the corresponding negative angles or angle ranges and vice-versa.

It is to be understood that the present invention relates to new tires, retreaded tires, and tire treads in strip form being at least partly vulcanized and having a pattern of grooves and blocks integral therewith.

Figure 3:
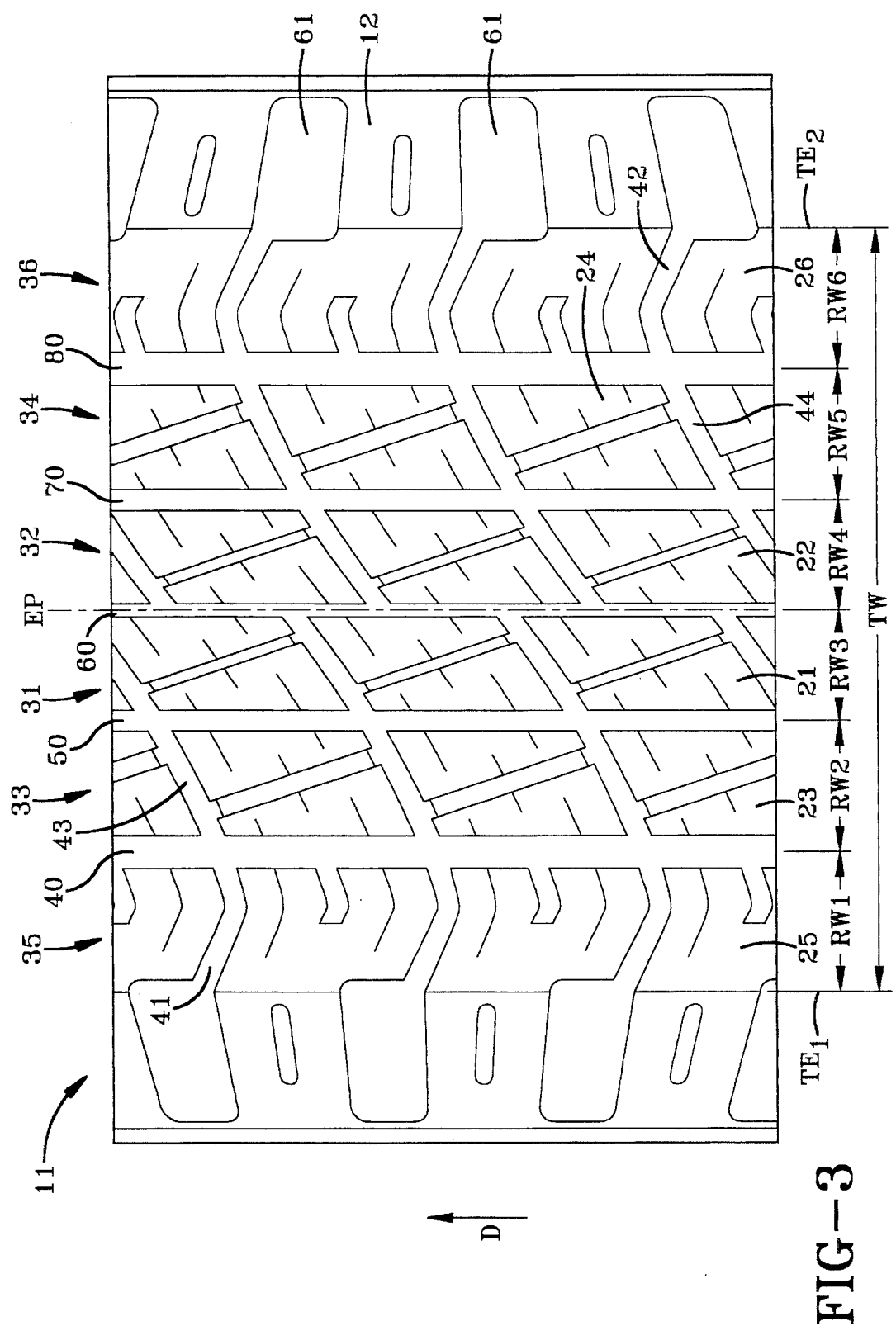
FIG. 3 is an enlarged fragmentary view of a second embodiment of the tire according to the invention.

Reference numbers for the same elements of the tire of the invention are the same throughout the drawings; the numbers designating elements of the tire represented in FIG. 3 which differ from those shown on FIG. 2, bear the same number where a "0" has been added.

Figure 1:
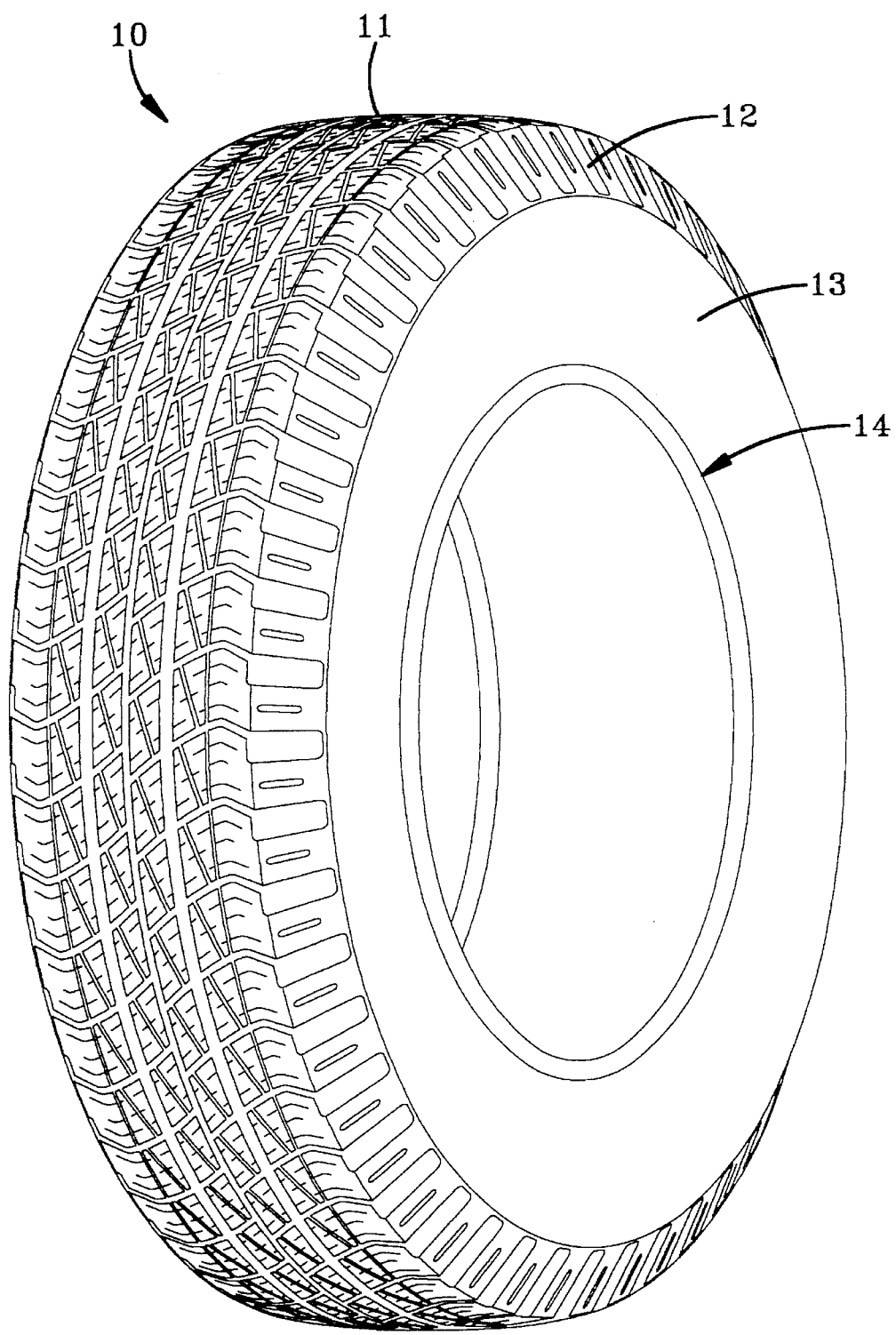
FIG. 1 is a perspective front view of a tire made in accordance with the invention having six circumferential rows of blocks.

With reference now to FIG. 1 a pneumatic tire 10 having a ground contacting tread 11 is illustrated. The tread is adjacent to shoulders 12 which are in turn adjacent to sidewalls 13 that extend radially inwardly from the tread to the area 14 of the beads. Carcass plies reinforced by textile cords wrap around the beads and support the tread in a crown area of the tire as is usual in the tire art.

Referring now to FIG. 2, there is represented an enlarged fragmentary view of the tread of the tire shown in FIG. 1. The tread 11 has five circumferentially extending straight grooves 4–8 (hereafter respectively referred to as center groove 6, middle grooves 5,7 and shoulder grooves 4,8) therein, spaced apart axially across the surface of the tread. By circumferentially extending "straight groove" is meant that the groove edges are substantially parallel to one another and the points on the centerline of a circumferentially extending groove are substantially in the same plane. The circumferentially extending grooves 4–8 have a width ranging between 0.3% and 15% of the tread width. In the embodiment of the invention shown in FIG. 2 they have preferably a width of about 0.7% for shoulder grooves 4,8, a width of about 5.5% for middle grooves 5,7 and a width of about 3% of the tread width for center groove 6. It is understood that though there are five circumferentially extending grooves in the illustrated embodiments, the number may vary in accordance with the size of the tire.

The grooves divide the tread into six circumferentially extending rows 31–36 (hereafter respectively referred to as center rows 31, 32, middle rows 33,34 and shoulder rows 35,36) of elastomeric blocks 21–26. As measured in a tire footprint, the axial widths RW1–RW6 of the blocks of the center, middle and shoulder rows, delimited by the axial position of the centerline of the bordering circumferentially extending straight grooves, range between 10% and 20% of the tread width T (referred to as TW on FIG. 2) of the ground engaging portion of the tread.

A plurality of grooves extend across the tread from one lateral edge $TE_1$, to the opposite lateral edge $TE_2$ of the tire. They comprise two portions 41 and 42, which are circumferentially shifted along the center groove. The grooves are disposed circumferentially about the tire in a repetitive manner, their widths and inclinations depending on the pitch variation, as is practiced in the art for tire noise reduction. In the preferred embodiments represented in the figures, the laterally extending grooves 41,42 are, apart from the center shift, in the form of an elongated "S" configuration, comprising angled portions near the lateral tread edges $TE_1$, $TE_2$ and an elongated, only slightly curved central portion 43,44.

The slightly curved central portion of a lateral groove 43 located on the left side of the tread as shown on FIG. 2, forms an angle of at least 100° and preferably an angle in the range of 115° to 135° with the equatorial plane of the tire.

The elastomeric blocks 21–26 are defined by the two adjacent circumferentially 4–8 and S-shaped laterally extending grooves 41, 42. Each of the blocks 21–24 of the middle and center rows of blocks 31–34 comprises portions A, B and C. The laterally outer portions A and C of a block have a trapezoidal shape; the larger base 71 of one block portion is in alignment with the shorter base 73 of the other block portion and both aligned bases define part of the laterally extending grooves 41,42. One of the lateral sides 75 of the first trapezoidal shaped block portion A defines a circumferentially extending groove whereas the other lateral side 76 is substantially parallel to a lateral side 77 of the third block portion C and together define elastomeric bridge B. Elastomeric bridge B has a height of between 40% and 85% of the tread depth, a length of between 80% and 95% of the adjacent block portion length and a width of between 1% and 3% of the treadwidth. The height may be constant or varying over its length. In a preferred embodiment the elastomeric bridge B has a center portion with a depth of about 80% of the tread depth and two outer portions, neighboring the laterally extending grooves, with a depth of about 50% of the tread depth; the length of an outer portion is about half the length of a center portion. The inclination of the centerline of the middle portion B with respect to the equatorial plane is between 15° and 35° and preferably about 25° for a block located on the left side of the tread as shown on FIG. 2. The ratio of the length of the short base to the long base of the trapezoidal shaped first or third portion ranges between 0.10:1 and 0.35:1 and the ratio of the length of the long base to the height of the trapezoidal shaped first or third portion ranges between 0.45:1 and 0.70:1 or between 0.45:1 and 0.65:1.

Each of the laterally outer portions A and C may include several sipes 51, 52. In a preferred embodiment, the sipes originate in a circumferentially extending groove but do not extend through block portion A or C, i.e. they are so-called blind sipes. The sipes are oriented substantially parallel to the nearest laterally extending groove 41,42. Generally a sipe can have a depth equal to or less than the nominal depth of the tread; in a preferred embodiment, the sipes have a first portion nearest to a circumferentially extending groove with a depth ranging between 20% and 30% of the nominal tread depth and a second portion towards the center of the block with a depth of 60% to 80% of the nominal tread depth.

In the illustrated embodiment, the blocks 25, 26 of the shoulder rows 35, 36 each comprise only one single portion, delimited by two neighboring laterally extending grooves 41,42, the respective circumferentially extending shoulder groove 4,8 and the respective tread edge, $TE_1$ or $TE_2$. In the embodiment shown in FIG. 2, the blocks are spaced by laterally extending grooves which are slightly angled; the portion of the groove near the tread edge forming preferably with the equatorial plane an angle ranging between 68° and 80°, the other portion forming preferably an angle ranging between 100° and 110° for the blocks 25 located on the left side of the tread as shown on FIG. 2.

In a preferred embodiment, for appearance reasons and also to provide extra traction when the tire is operated in mud or sand, the portion of the laterally extending groove which is nearest to the shoulder, opens, at tread edge $TE_1$ or $TE_2$ into a wide void area 61, that continues into the shoulder 12.

The blocks of elastomeric material in each of the rows 31–36 are disposed circumferentially about the tire in a repetitive manner and in a given row they have substantially the same geometric shape. The inclination of the walls which are not parallel to the equatorial plane and the widths of the grooves separating two block portions in each row depend on the pitch variation.

Referring now to FIG. 3, an embodiment of the tire of the invention which has four rows of blocks, as described above, and two shoulder rows of blocks is illustrated. The features of the embodiment of FIGS. 3 are substantially similar to those illustrated for the tire of FIGS. 1–2, the difference being that in the embodiment shown on FIG. 3 the circumferentially extending grooves 30, 40, 50, 60 and 70, have an axial width, between 1% to 2.5% for the groove located on the equatorial plane, 2% to 4.5% for the middle grooves, and 3.5% to 6% of the tread width for the shoulder grooves.

Such an embodiment is believed to confer a better handling and aquaplaning performance to the tire.

The generation of noise while running on pavement is a particular problem encountered in tires designed for use off-road. The tread of the invention minimizes the noise (and it has been found, lowers the rolling resistance) of the tire by dividing a block into three portions, two large portions and therebetween one elongated narrow portion, the elongated portion having a lower height, which are believed to have low noise emission. Furthermore as the different portions A, B and C of a block are tied to each other, the hum caused by distortion of a block, when entering the footprint, and its restoration to its original shape, when leaving the footprint, is minimized.

A further reduction of noise is obtained by shifting the two portions 41 and 42 of the laterally extending grooves, so that no two blocks enter the footprint at the same time. It is believed that the shift should range between 30% and 60% of the length of the lateral side of the elastomeric blocks defining the center groove 6. As can be seen in FIGS. 2 and 3, none of the blocks across the tire are axially aligned.

The invention is further illustrated by the following example: A steel belted radial carcass tire of size 225/70 R 16 was made with a tread width of about 240 mm and six rows of blocks. The rows of blocks were molded to have axial widths RW1 and RW3 of about 29 and 22 mm respectively. The pitch ratios were set at 35, 43 and 55 and the tread includes 52 circumferentially spaced pitches.

The nominal tread depth is about 90 mm, and the widths of the grooves depend on their axial position in the tread and the pitch variation. The circumferentially extending grooves have a width of about 80 mm.

Two carcass plies comprise 1100/2 dtex polyester reinforcement cords and an uncured cord density of 29 ends per inch (EPI) was used in the construction. The belt structure of an uncured tire comprises two single cut plies reinforced by 2+2×0.25 mm steel cords, having a cord density of about 22 EPI, forming uncured angles of about 23° with the equatorial plane, the angles of the cables in different plies extending in opposite directions. The tire includes 2 turns of an overlay ply reinforced with 940/2 dtex Nylon having a cord density of 30 EPI, and a substantially zero degree inclination with respect to the equatorial plane.

The tread has a net to gross of 60% to 75% and comprises an elastomeric compound having a modulus of 4 to 16 MPa, a Shore A hardness of 60 to 75, an elongation greater than 300% and a tensile strength at break greater than 15 MPa.

While certain representative embodiments have been described for the purpose of illustrating the invention, it will be apparent to those skilled in the art that various changes and modifications may be made therein without departing from the scope of the claims. The invention has for instance been described with a design showing six rows of blocks; it can be envisioned for smaller tire sizes, to choose a four row design, suppressing thereby two center rows of blocks, or for larger tire sizes to choose an eight row design, adding a set of intermediate rows of blocks.

We claim:

1. A pneumatic tire having a ground contacting tread portion comprising circumferentially extending grooves and laterally extending grooves defining circumferentially extending rows of blocks comprising two rows of shoulder blocks and at least a further row of blocks therebetween, wherein each block of said further row of blocks comprises first and third laterally outer portions and a second portion, the first and third portions having a trapezoidal shape with a short and a long base and two lateral sides each lateral side being longer than either base, the longer base of the first portion being substantially in alignment with the shorter base of the third portion and the bases delimiting part of a laterally extending groove, wherein one of the lateral sides of each of the first and third trapezoidal shaped portions delimits part of a circumferentially extending groove and wherein the other of the lateral sides of the first and third portion are adjacent to and substantially parallel to each other and together define the second portion, wherein the height of the first and third portions is equal to the tread depth, and wherein the second portion has a height of between 45% and 85% of the height of the first or third portion, a length of between 80% and 95% of the length of the adjacent lateral side of the first or third portion and a width of between 1% and 3% of the tread width and wherein the inclination of the centerline of the second portion with respect to the equatorial plane is between 15° and 35°.

2. The pneumatic tire of claim 1, wherein the ratio of the length of the short base to the long base of the trapezoidal shaped first or third portion is between 0.10:1 and 0.35:1.

3. The pneumatic tire of claim 2, wherein the ratio of the length of the long base to the height of the trapezoidal shaped first or third portion is between 0.45:1 and 0.70:1.

4. The pneumatic tire of claim 1, wherein sipes are located in said first and third portions.

5. The pneumatic tire of claim 1, wherein each laterally extending groove comprises two circumferentially shifted groove portions, each groove portion extending continuously from the equatorial plane of the tire to a tread edge.

6. The pneumatic tire of claim 1 wherein the shoulder blocks are circumferentially separated by laterally extending angled grooves.

7. The pneumatic tire of claim 1 wherein there are four further rows of blocks between the two rows of shoulder blocks.

8. The pneumatic tire of claim 7, wherein five circumferentially extending grooves separate the six rows of blocks, one of said five grooves is located on the equatorial plane of the tire, and said circumferentially extending grooves are straight grooves and have a width between 0.3% and 1.8% of the tread width for the two grooves closest to the shoulder, a width between 2.5% and 4.5% of the tread width for the groove located on the equatorial plane of the tire and a width between 4.5% and 6.5% of the tread width for the grooves located therebetween.

9. The pneumatic tire of claim 7, wherein five circumferentially extending grooves separate the six rows of blocks, one of said five grooves is located on the equatorial plane of the tire, and said circumferentially extending grooves are straight grooves and have a width between 3.5% and 6% of the tread width for the two grooves closest to the shoulder, a width between 1% and 2.5% for the groove located on the equatorial plane and a width between 2% and 4.5% of the tread width for the two grooves located therebetween.

\* \* \* \* \*